United States Patent
Hajduczenia

(10) Patent No.: US 10,944,704 B1
(45) Date of Patent: Mar. 9, 2021

(54) METHOD AND SYSTEM FOR REDUCING THE SIZES OF ELECTRONIC MESSAGES

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/661,165

(22) Filed: Oct. 23, 2019

(51) Int. Cl.
G06F 15/16 (2006.01)
H04L 12/58 (2006.01)
H04L 29/08 (2006.01)

(52) U.S. Cl.
CPC .......... H04L 51/066 (2013.01); H04L 51/10 (2013.01); H04L 51/16 (2013.01); H04L 69/329 (2013.01)

(58) Field of Classification Search
CPC ..... H04L 51/066; H04L 51/10; H04L 69/329; H04L 51/16
See application file for complete search history.

(56) References Cited

U.S. PATENT DOCUMENTS

| | | | |
|---|---|---|---|
| 6,330,589 B1* | 12/2001 | Kennedy | G06Q 10/107 707/999.104 |
| 6,823,368 B1 | 11/2004 | Ullmann et al. | |
| 7,596,603 B2 | 9/2009 | Chen et al. | |
| 7,818,378 B2 | 10/2010 | Buchheit et al. | |
| 9,749,273 B2* | 8/2017 | Zlatokrilov | H04L 51/16 |
| 9,912,618 B2* | 3/2018 | Lee | H04L 65/1076 |
| 10,387,952 B1* | 8/2019 | Sandhu | G06Q 40/04 |
| 2004/0221295 A1 | 11/2004 | Kawai et al. | |
| 2005/0198158 A1* | 9/2005 | Fabre | G06Q 10/107 709/206 |
| 2008/0109462 A1* | 5/2008 | Adams | G06Q 10/107 |
| 2008/0162651 A1* | 7/2008 | Madnani | G06Q 10/107 709/206 |
| 2009/0319617 A1* | 12/2009 | Bhakar | G06Q 10/107 709/206 |
| 2010/0293240 A1* | 11/2010 | Lee | H04L 67/1097 709/206 |
| 2011/0302250 A1* | 12/2011 | Plotts | H04L 51/16 709/206 |

(Continued)

FOREIGN PATENT DOCUMENTS

AU 2011201989 B2 5/2011

*Primary Examiner* — Hieu T Hoang
(74) *Attorney, Agent, or Firm* — The Marbury Law Group, PLLC

(57) ABSTRACT

Methods, devices, and systems for reducing the sizes of electronic messages in a conversation. A client device processor may generate a message that includes a conversation identifier (convo-id) header field and determine whether the generated message is a first message in the conversation. The client device processor may generate a convo-id value and include the generated convo-id value in the convo-id header field of the generated message in response to determining that the generated message is the first message in the conversation. The client device processor may set the convo-id value of convo-id header field of the generated message equal to the value of a convo-id header field of a previous message in response to determining that the obtained message is not the first message in the conversation.

16 Claims, 10 Drawing Sheets

(56) References Cited

U.S. PATENT DOCUMENTS

| | | | | |
|---|---|---|---|---|
| 2014/0337444 | A1* | 11/2014 | Mizuta | H04L 51/28 |
| | | | | 709/206 |
| 2015/0019652 | A1* | 1/2015 | Ordogh | H04L 51/14 |
| | | | | 709/206 |
| 2015/0113076 | A1* | 4/2015 | Dubie | H04L 51/16 |
| | | | | 709/206 |
| 2015/0215241 | A1* | 7/2015 | Zhou | H04L 51/16 |
| | | | | 709/206 |
| 2016/0269337 | A1* | 9/2016 | Blinder | H04L 51/36 |
| 2017/0289086 | A1* | 10/2017 | Grotto | H04L 51/16 |
| 2018/0013710 | A1* | 1/2018 | Khan | H04L 63/1483 |
| 2018/0020008 | A1* | 1/2018 | Schoof | H04L 63/062 |
| 2018/0217848 | A1* | 8/2018 | Garai | H04L 51/16 |
| 2019/0207902 | A1* | 7/2019 | Gupta | H04L 51/32 |
| 2019/0244178 | A1* | 8/2019 | Carter | G06Q 10/109 |

* cited by examiner

METHOD AND SYSTEM FOR REDUCING THE SIZES OF ELECTRONIC MESSAGES

BACKGROUND

Electronic mail (email) is a well-established form of electronic communication that allows user devices to exchange plain or rich text, embedded multimedia (e.g., photos, audio files, video files, etc.), and various types of attachments (e.g., word documents, PDFs, multimedia, etc.). To facilitate communications between individuals, most email systems allow a recipient of an email message to reply with a second email message that includes the entirely of the initial received message plus additional content (e.g., text, embedded multimedia, attachments, etc.). This may create an email chain or "conversation" in which each recipient of an email message may place new content within the context of previous communications/content.

It is now common for email conversations to include many recipients and/or content from tens or hundreds of individual reply messages. Each time one of the recipients replies to an email message in the conversation, the entire history (e.g., the content from all previous messages in the email chain) is copied and re-transmitted to all the recipients. Since each reply message is be larger than each of the preceding messages in the email conversation, the message size of the conversation often grows exponentially. The conversation often consumes an excessive amount of the network resources (e.g., network bandwidth), cause network congestion, and/or otherwise degrade the performance or functioning of the network or user devices. In addition, these conversations require increasing amount of local storage for collecting, saving, and processing the growing email messages.

SUMMARY

The various aspects include methods of reducing the sizes of electronic messages in a conversation, which may include determining by a processor in a client device whether a message is a first message in the conversation, generating by the processor a conversation identifier (e.g., convo-id) value and including the generated convo-id value in a header field of the message in response to determining that the message is the first message in the conversation, setting the convo-id value of the header field of the message equal to a value of a corresponding header field of a previous message in response to determining that the message is not the first message in the conversation, and sending the message to a recipient device.

Some aspects may include generating, by the processor, the message to include a convo-id header field, in which including the generated convo-id value in the header field of the message in response to determining that the message is the first message in the conversation may include including the generated convo-id value in the convo-id header field of the generated message in response to determining that the generated message is the first message in the conversation, and setting the convo-id value of the header field of the message equal to the value of the corresponding header field of the previous message in response to determining that the message is not the first message in the conversation may include setting the convo-id value of the convo-id header field of the generated message equal to the value of the convo-id header field of the previous message in response to determining that the generated message is not the first message in the conversation.

Some aspects may include receiving, by a recipient device processor, the message from the client device, and associating, by the recipient device processor, the received message with the conversation based on the convo-id value of the convo-id header field of the received message. In some aspects, generating the message that includes the convo-id header field may include generating the message to include the convo-id header field, a message-id header field, and a reply-to header field. Some aspects may include using a hash to determine the value for the message-id header field of the generated message. Some aspects may include setting the value of the reply-to header field of the generated message to null in response to determining that the generated message is the first message in the conversation, and setting the value of the reply-to header field of the generated message based on the value of the message-id header field of the previous message in response to determining that the generated message is not the first message in the conversation.

Some aspects may include receiving, by a recipient device processor, the message from the client device, associating, by the recipient device processor, the received message with the conversation based on the convo-id value of the convo-id header field of the received message, and placing, by the recipient device processor, the received message within the conversation relative to other messages in the conversation based on the value of the reply-to header field of the received message.

Further aspects may include a client device that includes a processor configured with processor-executable instructions to determine whether a message is a first message in a conversation, generate a conversation identifier (e.g., convo-id) value and include the generated convo-id value in a header field of the message in response to determining that the message is the first message in the conversation, set the convo-id value of the header field of the message equal to a value of a corresponding header field of a previous message in response to determining that the message is not the first message in the conversation, and send the message to a recipient device.

In some aspects, the processor may be configured to generate the message to include a convo-id header field, include the generated convo-id value in the header field of the message in response to determining that the message is the first message in the conversation by including the generated convo-id value in the convo-id header field of the generated message in response to determining that the generated message is the first message in the conversation, and set the convo-id value of the header field of the message equal to the value of the corresponding header field of the previous message in response to determining that the message is not the first message in the conversation by setting the convo-id value of the convo-id header field of the generated message equal to the value of the convo-id header field of the previous message in response to determining that the generated message is not the first message in the conversation.

In some aspects, the processor may be configured to cause a recipient device processor to receive the message from the client device and associate the received message with the conversation based on the convo-id value of the convo-id header field of the received message. In some aspects, the processor may be configured to generate the message that includes the convo-id header field by generating the message to include the convo-id header field, a message-id header field, and a reply-to header field. In some aspects, the processor may be configured to use a hash to determine the value for the message-id header field of the generated message.

In some aspects, the processor may be configured to set the value of the reply-to header field of the generated message to null in response to determining that the generated message is the first message in the conversation, and set the value of the reply-to header field of the generated message based on the value of the message-id header field of the previous message in response to determining that the generated message is not the first message in the conversation. In some aspects, the processor may be configured to cause a recipient device processor to receive the message from the client device, associate the received message with the conversation based on the convo-id value of the convo-id header field of the received message, and place the received message within the conversation relative to other messages in the conversation based on the value of the reply-to header field of the received message.

Further aspects may include a non-transitory computer readable storage medium having stored thereon processor-executable software instructions configured to cause a processor in a client device to perform operations for reducing sizes of electronic messages in a conversation, the operations including determining whether a message is a first message in the conversation, generating a conversation identifier (e.g., convo-id) value and including the generated convo-id value in a header field of the message in response to determining that the message is the first message in the conversation, setting the convo-id value of the header field of the message equal to a value of a corresponding header field of a previous message in response to determining that the message is not the first message in the conversation, and sending the message to a recipient device. In some aspects, the stored processor-executable software instructions may be configured to cause the processor to perform operations further including generating the message to include a convo-id header field.

In some aspects, the stored processor-executable software instructions may be configured to cause the processor to perform operations such that including the generated convo-id value in the header field of the message in response to determining that the message is the first message in the conversation may include including the generated convo-id value in the convo-id header field of the generated message in response to determining that the generated message is the first message in the conversation. In some aspects, the stored processor-executable software instructions may be configured to cause the processor to perform operations such that setting the convo-id value of the header field of the message equal to the value of the corresponding header field of the previous message in response to determining that the message is not the first message in the conversation may include setting the convo-id value of the convo-id header field of the generated message equal to the value of the convo-id header field of the previous message in response to determining that the generated message is not the first message in the conversation.

In some aspects, the stored processor-executable software instructions may be configured to cause the processor to perform operations further including causing a recipient device processor to perform operations including receiving the message from the client device, and associating the received message with the conversation based on the convo-id value of the convo-id header field of the received message. In some aspects, the stored processor-executable software instructions may be configured to cause the processor to perform operations such that generating the message that includes the convo-id header field may include generating the message to include the convo-id header field, a message-id header field, and a reply-to header field. In some aspects, the stored processor-executable software instructions may be configured to cause the processor to perform operations further including using a hash to determine the value for the message-id header field of the generated message.

In some aspects, the stored processor-executable software instructions may be configured to cause the processor to perform operations further including setting the value of the reply-to header field of the generated message to null in response to determining that the generated message is the first message in the conversation, and setting the value of the reply-to header field of the generated message based on the value of the message-id header field of the previous message in response to determining that the generated message is not the first message in the conversation. In some aspects, the stored processor-executable software instructions may be configured to cause the processor to perform operations further including causing a recipient device processor to perform operations including receiving the message from the client device, associating the received message with the conversation based on the convo-id value of the convo-id header field of the received message, and placing the received message within the conversation relative to other messages in the conversation based on the value of the reply-to header field of the received message.

Further aspects may include a system that includes a client device having a client device processor and a recipient device having a recipient device processor, in which the client device processor is configured with processor-executable instructions to generate a message that includes a conversation identifier (e.g., convo-id) header field, a message-id header field, and a reply-to header field, determine whether the generated message is a first message in a conversation, generate a convo-id value, include the generated convo-id value in the convo-id header field of the generated message and set a value of the reply-to header field of the generated message to null in response to determining that the generated message is the first message in the conversation, set the convo-id value of the convo-id header field of the generated message equal to the value of the convo-id header field of a previous message and set the value of the reply-to header field of the generated message based on the value of the message-id header field of the previous message in response to determining that the generated message is not the first message in the conversation, and send the message to the recipient device. The recipient device processor may be configured with processor-executable instructions to receive the message from the client device, associate the received message with the conversation based on the convo-id value of the convo-id header field of the received message, and place the received message within the conversation relative to other messages in the conversation based on the value of the reply-to header field of the received message.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
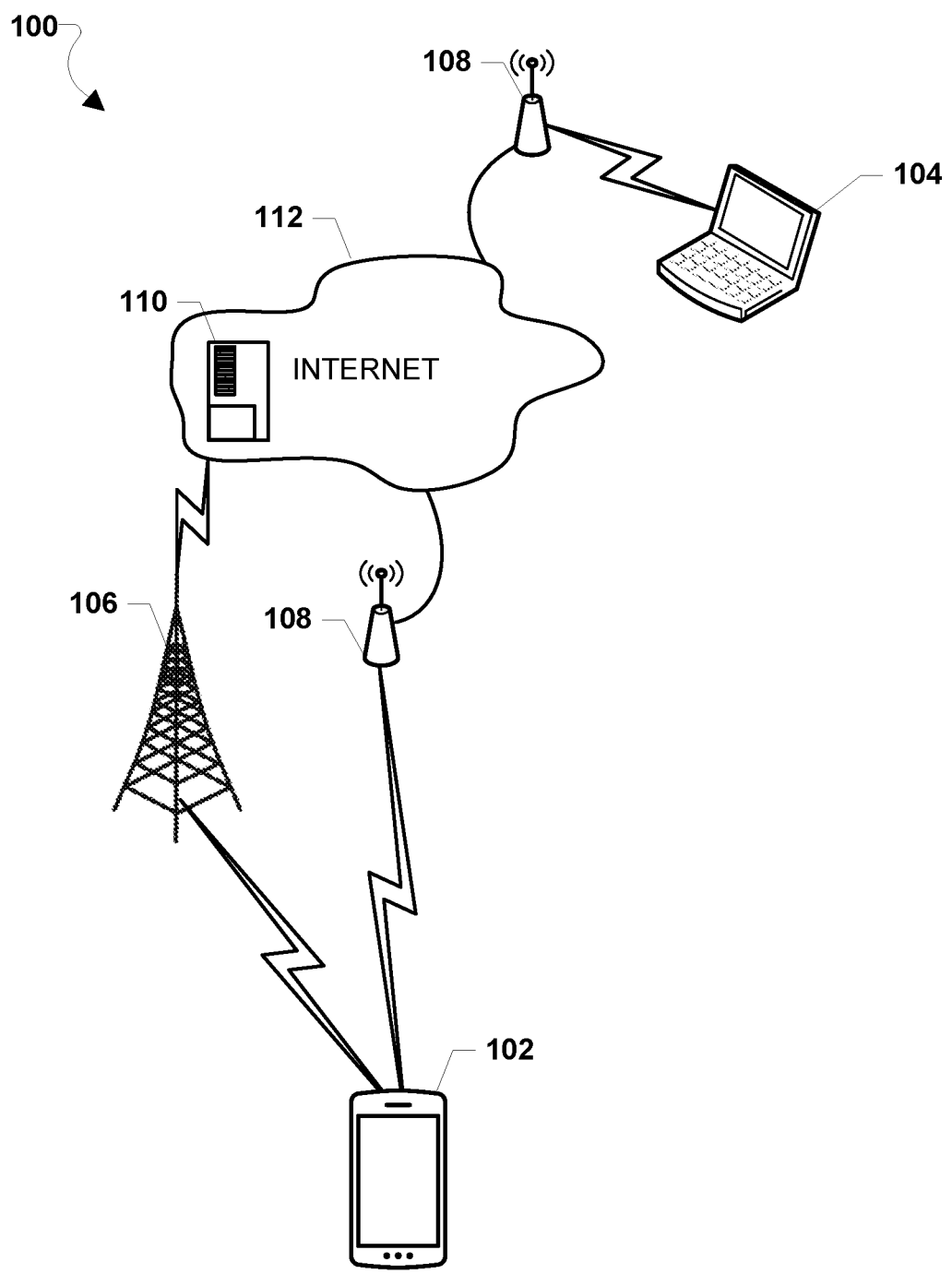
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments allow individuals to participate in an email conversation, and readily access and read all previous emails pertaining to the given email conversation to place the new content within the proper context, without copying and retransmitting the content of the previous email messages in each message added to the conversation.

The terms "user device," "user equipment," "client device" may be used interchangeably herein and to refer to any one or all of cellular telephones, smart phones, mobile device, personal or mobile multi-media players, personal data assistants (PDA's), portable computers, laptop computers, tablet computers, smart books, palm-top computers, wireless electronic mail receivers, multimedia Internet enabled cellular telephones, wireless gaming controllers, and similar personal electronic devices which include a programmable processor and memory and circuitry for sending and/or receiving messages, such as electronic mail (email).

The terms "component," "module," "system," and the like may be used herein to refer to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a client device and the client device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "mail server" is used herein to refer to a component that transfers email messages between computing systems via Simple Mail Transfer Protocol (SMTP) or another similar protocol, delivers email messages to a recipient's mailbox, stores the email messages in a mailbox, and/or performs other similar operations. In various embodiments, a mail server may include or encompass a datastore, a message transfer agent (MTA), a message delivery agent (MDA), local delivery agent (LDA), and/or other similar components.

The term "email client" is used herein to refer to any software application or component that provides client devices access to the email messages or mailboxes on a mail server. An email client may also perform various other functions, including functions related to message reception, message rendering, message management, message composition, message formatting and/or message transmissions.

The terms "email conversation" or "conversation" may be used interchangeably herein and refer to a message chain (e.g., email chain) that includes an original message, at least one reply to the original message, and at least two participating users, accounts, email clients or user devices.

A number of different messaging services, standards, protocols and technologies are available or contemplated in the future, any or all of which may implemented or used by client devices configured in accordance with the various embodiments. Examples include Multipurpose Internet Mail Extensions (MIME), Messaging Application Programming Interface (MAPI), Internet Message Access Protocol (IMAP), Post Office Protocol version 3 (POP3), Simple Mail Transfer Protocol (SMTP), Extensible Messaging and Presence Protocol (XMPP), Internet Relay Chat (IRC), and Apple Push Notification service (APNs).

Per standards (e.g., RFC 5322 and 2047, MIME, etc.), the message structure of each email message includes an envelope portion and a content portion. The content portion includes a message header portion and a message body portion. The message header portion includes various header fields, each of which may be a destination field (e.g., To, CC, BCC, etc.) or an originator field (e.g., From, Sender, Reply-To, In-Reply-To, etc.). The standards also require that the header fields include a From header field and a Date header field. The value of the From header field may be used by components (e.g., mail servers, client devices, email clients, etc.) to identify the sender's email address. The value of the Date header field may be used to identify local time and date that the message was created or sent.

Other standards (e.g., RFC 3864, etc.) provide registration procedures for additional header fields. These additional header fields may include fields such as To, Subject, CC, BCC, Content-Type, Precedence, Message-ID, In-Reply-To, References, Reply-To, Sender, and Archived-At. Each of these additional header fields may be used for a specific purpose. For example, the value of Message-ID header field may be generated automatically and used to prevent multiple delivery of the same message to the same recipient. The value of the Reply-To header field identifies the address (e.g., email address, etc.) that should be used to reply to the message. The value of the In-Reply-To header field may be equal to the Message-ID value of a related message (e.g., the message it is in reply to) and/or used to link the reply message to other related messages (e.g., the messages it is in reply to).

While these header fields contain information that may be useful or important for the proper functioning of modern email system, the header fields do not include information that may be suitable for identifying an email conversation. That is, email is a well-established form of electronic communication that allows individuals to exchange plain or rich text, embedded multimedia media (e.g., photos, videos, etc.), and various types of attachments (e.g., word documents, PDFs, multimedia, etc.). To facilitate communications between individuals, most email systems allow a recipient of an email message to reply with a second email message that includes the entirely of the received message plus additional content (e.g., text, embedded media, attachments, etc.). This may create an email chain or "conversation" in which each recipient of an email message may place new content within the context of previous communications/content.

It is becoming increasingly common for such email conversations to include many recipients and/or content from tens or hundreds of individual email messages. Each time one of the recipients replies to an email message in the conversation, the entire history (e.g., the content from all previous messages in the email chain) is copied and re-transmitted to all the recipients. That is, each new reply in the email conversation contains a complete copy of all previous emails pertaining to the given email conversation. As such, each reply message may be larger than each of the previous messages in the email chain. This phenomenon, also known as email size bloat, may consume an excessive amount of the often-limited network resources (e.g., network bandwidth), and could cause network congestion or otherwise degrade the user experience.

The various embodiments allow individuals to participate in an email conversation, and readily access and read all previous emails pertaining to the given email conversation to place the new content within the proper context, without copying and retransmitting the content of previous email messages in the conversation via each reply message. Thus, the size of the email sent, received and stored may be significantly reduced.

The embodiments may include components (e.g., client devices, email clients, mail servers, etc.) configured to modify how an email message is structured and how the email message is processed by the email clients.

Some embodiments may include components configured to receive an email message that does not include content from other previously sent email messages, associate the received email message with a conversation, identify other email messages that are part of the conversation, place the received message within the conversation relative to the other email messages in conversation, and render the content of the received email in conjunction with the content of all the previous emails messages in the conversation on an electronic display of a client device in a manner that provides context to the user/individual.

Some embodiments may include components configured to determine that a user is replying to an email message that is part of larger conversation; intelligently determine the content that should be included in the reply email message; and structure the reply email message so that it does not include the entire history (e.g., the content from all previous messages in the email chain) but allows the devices that receive the reply message to rebuild the entire email conversation. That is, rather than re-transmitting the entirety of the previously received messages in the reply message, the embodiments allow reply messages to include just the additional content (e.g., text, embedded media, attachments, etc.). As such, the embodiments may reduce network congestion, allow user devices to make more efficient use of limited network and bandwidth resources as well as efficient use of processing and storage resources, and/or otherwise improve the user experience.

Some embodiments may include components configured to expand or modify an email message structure in order to identify a conversation, and identify individual emails associated with the identified conversation, on each client device participating in the conversation. In some embodiments, identifying conversations and individual emails associated with the identified conversation may be accomplished by modifying an email message structure to include a convo-id header field and/or a convo-id-type header field that may be used to identify a conversation. In some embodiments, the email message structure may also be modified so that the values of the message id header field and the reply-to header field include information that is different from information included by conventional solutions in the same or similar header fields. For example, components configured in accordance with the various embodiments may set/use the values of the message id and reply-to header fields to reduce the size of reply messages associated with a conversation and/or the number of complete message retransmissions included in the reply messages associated with the conversation.

FIG. 1 illustrates an example network system 100 suitable for use with the various embodiments. In the example illustrated in FIG. 1, the network system 100 includes client devices in the form of a mobile device 102 and a portable computer 104. The network system also includes a base station 106, an access point 108 (e.g., Wi-Fi access point, etc.), and a mail server 110. The mobile device 102 and the portable computer 104 may be configured to connect to the Internet 112 via the access point 108 wither wirelessly or through a wired connection. The mobile device 102 may also be configured to connect to the Internet 112 via the base station 106. The access point 108 or base station 106 may communicate with a router and/or a mail server 110, which may be coupled to, or deployed within, the Internet 112.

Figure 2:
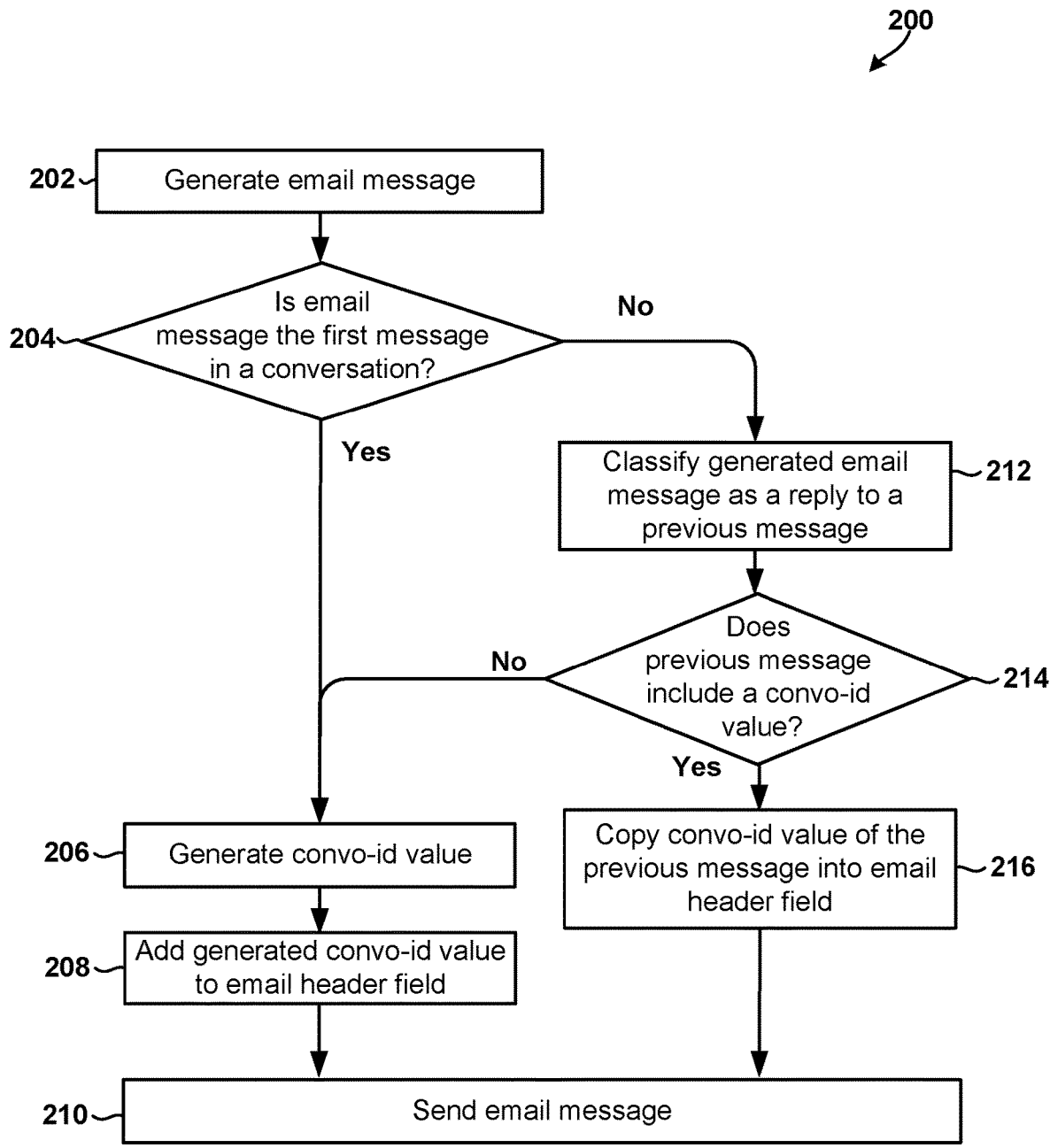
FIGS. 2-4 are process flow diagrams illustrating methods for generating reduced sized messages in accordance with various embodiments.
Figure 3:
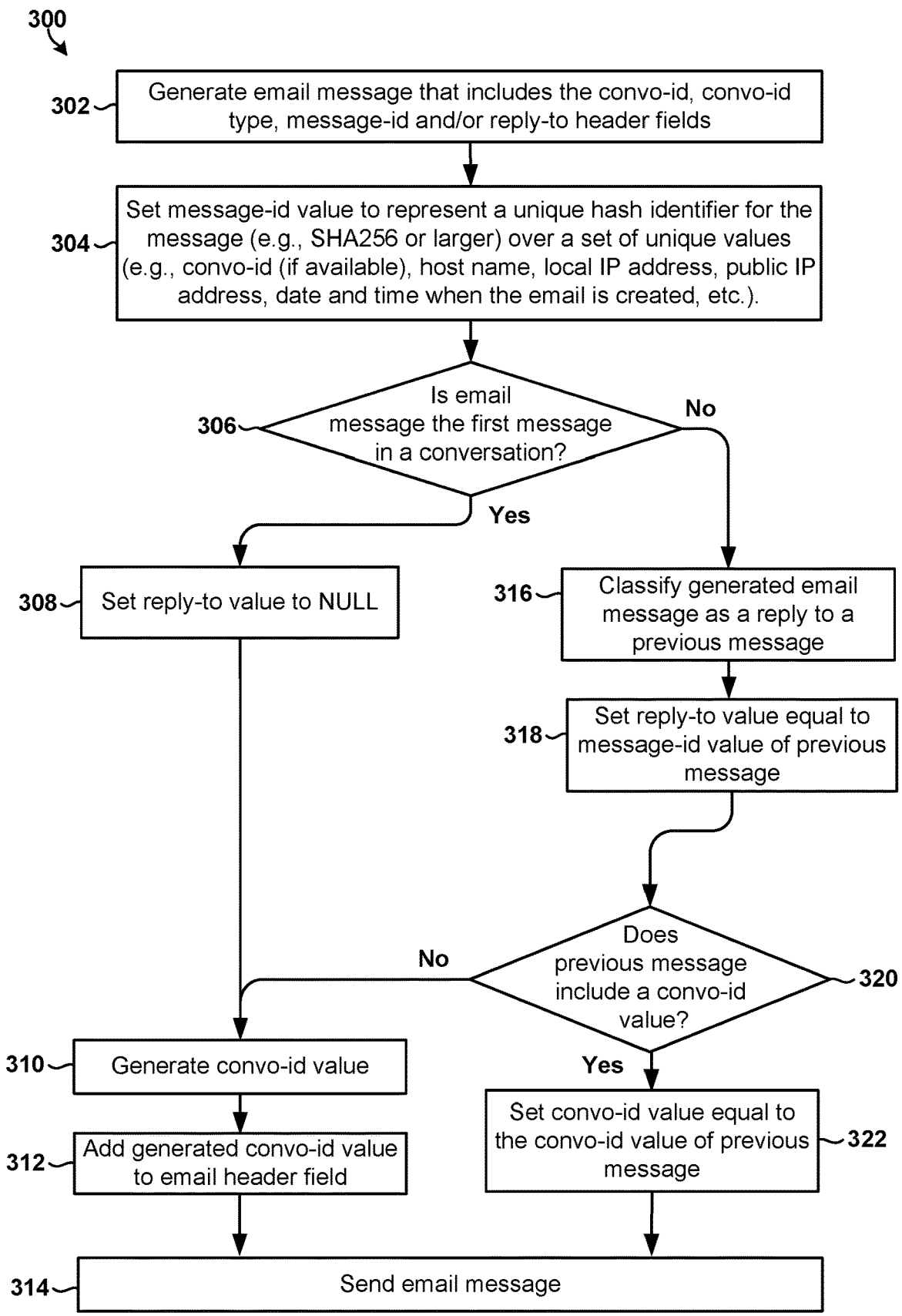
Figure 4:
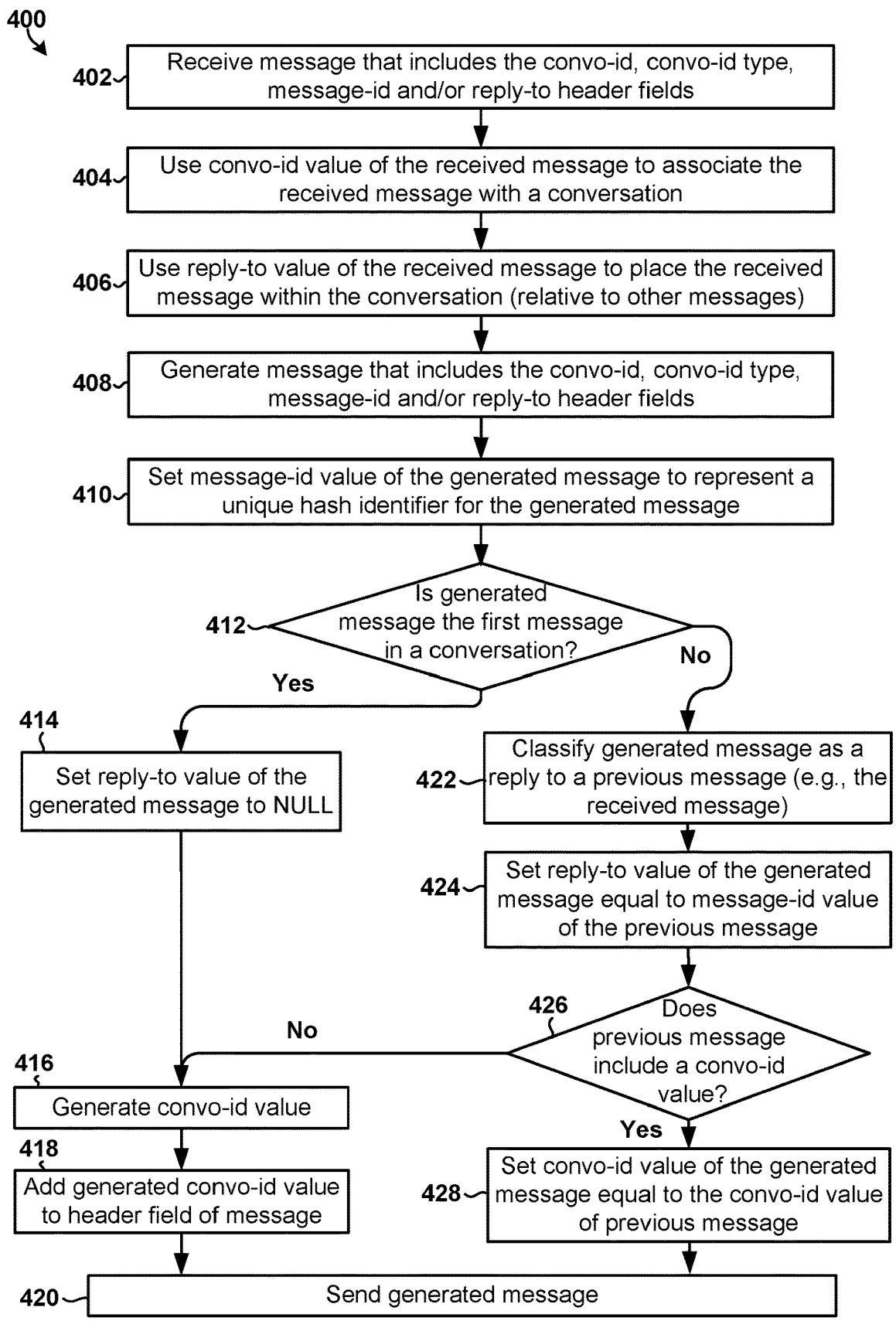

FIGS. 2-4 illustrate methods 200, 300, 400 of reducing the size of email messages associated with a conversation in accordance with various embodiments. All or portions of methods 200, 300, and 400 may be performed by a processor in a client device that includes an email client (or an extended email client) and/or by a server processor in a mail server.

With reference to FIG. 2, an embodiment of the disclosed method is illustrated. In block 202, the processor may perform various operations to commence generating an email message. In some embodiments, the processor may generate the email message to include a convo-id header field and/or a convo-id type header field in block 202.

In determination block 204, the processor may determine whether the email message is the first message in a conversation. In some embodiments, the processor may be configured to determine that the email message is the first message in a conversation based on the email not being associated with any other messages, or based on user or email client designating the new message as the start of a new conversation or as the start of tangent conversation that includes different participants or extends a different line of thought than the original conversation. In response to determining that the email message is the first message in a conversation (i.e., determination block 204="Yes"), the processor may compute or generate a convo-id value in block 206.

Thus, the convo-id value may be generated by a client device sending the first email in the conversation (i.e., the conversation originator). The convo-id value may be a unique conversation identifier that is used by, for, and in all email messages participating in this conversation. In some embodiments, the convo-id value may be generated to be a unique value that does not repeat itself. In some embodiments, the convo-id value may be generated by creating a large hash value (e.g., cryptographic hash, SHA256 or larger) over a set of unique values (e.g., host name, local IP address, public IP address, date and time when the email was first created, etc.). A hash may be a 'one-way' cryptographic function that generates a fixed size hash that is independent of size of the content that is hashed. SHA256 is a type of cryptographic hash that generates an almost-unique 256-bit (32-byte) signature for a message. Other suitable hash values are within the contemplated scope of disclosure.

In some embodiments, as part of the operations in block 206, the processor may compute or generate a convo-id type value. The convo-id type value may include information regarding the cryptographic hash that was used to generate the convo-id value in block 206 and/or other information that could be used by a recipient to identify the initial email in the conversation and any subsequent reply email messages associated with the conversation.

In block 208, the processor may add the generated convo-id value and/or convo-id type value to the email header field (e.g., the convo-id header field). In block 210, the processor may send the email message. For example, the processor may send the generated email message to a mail server for forwarding to a mailbox of an intended recipient.

In response to determining that the email message is not the first message in a conversation (i.e., determination block 204="No"), the processor may classify the generated email message as a reply to a previous email message in block 212. The processor may also use any or all techniques disclosed in this application or known in the art to identify the previous email message in block 212. In determination block 214, the processor may determine whether the previous email message includes a convo-id value.

In response to determining that the previous email message includes a convo-id value (i.e., determination block 214="Yes"), the processor may copy the convo-id value of the previous email message into an email header field (e.g., the convo-id header field) of the generated email in block 216. The processor may send the email message in block 210.

In response to determining that the previous message does not include a convo-id value (i.e., determination block 214="No"), the processor may compute or generate a convo-id value in block 206 and add the generated convo-id value to the email header field in block 208. That is, the processor may create a conversation identifier (convo-id value) that will also be used by other clients (extended or legacy) participating in the conversation in blocks 206 and 208. The processor may send the email message in block 210.

With reference to FIG. 3, another embodiment of the disclosed method is illustrated. In block 302, the processor may commence generating an email message that includes the convo-id, convo-id type, message-id and/or reply-to header fields. In block 304, the processor may set the message-id value to represent a unique cryptographic hash identifier for the message (e.g., SHA256 or larger) over a set of unique values (e.g., convo-id, host name, local IP address, public IP address, date and time when the email is created, etc.).

In determination block 306, the processor may determine whether the email message is the first message in a conversation. In response to determining that the email message is the first message in a conversation (i.e., determination block 306="Yes"), the processor may set the reply-to value to Null in block 308. The processor may compute or generate a convo-id value in block 310, add the generated convo-id value to the email header field in block 312, and send the generated email in block 314.

In response to determining that the email message is not the first message in the conversation (i.e., determination block 306="No"), the processor may classify the generated email message as a reply to a previous message in block 316 and set the reply-to value equal to message-id value of the previous message in block 318.

In determination block 320, the processor may determine whether the previous email message includes a convo-id value. In response to determining that the previous message does not include a convo-id value (i.e., determination block 320="No"), the processor may generate a convo-id value in block 310, add the generated convo-id value to the email header field in block 312, and send the generated email in block 314.

In response to determining that the previous email message includes a convo-id value (i.e., determination block 320="Yes"), the processor may set the convo-id value equal to the convo-id value of the previous message in block 322, and send the generated email in block 314.

With reference to FIG. 4, another embodiment of the disclosed method is illustrated. In block 402, the processor may receive a message that includes the convo-id, convo-id type, message-id and/or reply-to header fields. In block 404, the processor may use the convo-id value of the received message to associate the received message with a conversation. In block 406, the processor may use the reply-to value of the received message to place the received message within the conversation (relative to other messages). In blocks 408-428, the processor may perform the same or similar operations as discussed above with reference to blocks 302-322 of FIG. 3.

For example, in block 408, the processor may generate a message that includes the convo-id, convo-id type, message-id and/or reply-to header fields. In block 410, the processor may set the message-id value of the generated message to represent a unique cryptographic hash identifier for the generated message (e.g., SHA256 or larger) over a set of unique values (e.g., host name, local IP address, public IP address, date and time when the email is created, etc.).

In determination block 412, the processor may determine whether the generated message is the first message in a conversation. In response to determining that the generated message is the first message in a conversation (i.e., determination block 412="Yes"), the processor may set the reply-to value of the generated message to Null in block 414. The processor may compute or generate a convo-id value in block 416, add the generated convo-id value to a header field of the message in block 418, and send the generated message in block 420.

In response to determining that the generated message is not the first message in the conversation (i.e., determination block 412="No"), the processor may classify the generated message as a reply to a previous message in block 422 and set the reply-to value of the generated message equal to message-id value of the previous message in block 424, and determine whether the previous message includes a convo-id value in determination block 426.

In response to determining that the previous message does not include a convo-id value (i.e., determination block 426="No"), the processor may generate a convo-id value in block 416, add the generated convo-id value to the header field of the generated message in block 418, and send the generated message in block 420.

In response to determining that the previous message includes a convo-id value (i.e., determination block 426="Yes"), the processor may set the convo-id value of the generated message equal to the convo-id value of the previous message in block 428, and send the generated message in block 420.

A reply message generated by a legacy client (e.g., a client device or email client that is not support convo-id and rules of copying convo-id in the header field) may break the chain or associations between the individual emails and the conversation. As such, in some embodiments, the client devices may be configured to use any or all of the methods disclosed in this application or in use by legacy clients to identify conversations and copy convo-id from previously received messages.

It may also be possible for more than one client device to reply to a message from a legacy client without a convo-id, thereby generating two different convo-ids independently and sending them to other recipients. As such, in some embodiments, the client devices may be configured to run a contention resolution protocol in this case, whereby a message received as a reply to a message from a legacy client that contains a convo-id that is different than a locally generated convo-id is subject to a test condition that is based on the timestamps embedded in the header fields. For example, a client device may be configured to accept the convo-id of a received message and to update the local convo-id for a conversation in response to determining that the timestamp of a received message is less than, smaller, or earlier than a timestamp of the locally generated message. The client device may be configured to continue using its local convo-id for a conversation, and rely on other clients to perform a similar timestamp-based resolution of convo-ids, in response to determining that the timestamp of a received message is not less than (or not smaller, not earlier, etc.) than a timestamp of the locally generated message.

In some embodiments, the client devices may be configured to use the convo-id value to organize and present messages in a conversation. It may not be enough to search all received messages for convo-id values and sort them accordingly. If the above described methods (e.g., methods 200-400) and rules associated with generation and copying convo-id within the confines of the conversation are maintained, the convo-id could be used to filter all messages based on their associated conversation and the timestamps (date/time) could be used to sort messages within the conversation.

When two or more reply messages to the given message are received, the two or more replies to the given message may be sorted by the server 110 or receiving client device (102, 104) by their receipt date. The client device (102, 104) may examine the message-id and reply-to field values. The client device (102, 104) may use the value from the reply-to field to properly place the received reply message in the conversation (relative to other messages). The client device (102, 104) may use the value from the message-id field to populate the reply-to field in any message created in reply to the received message. The reply message does not carry the content of the previous message(s) and it associates with the whole conversation only through the series of message-id and reply-to field values, creating a complete conversation. In this way, each reply message is much smaller, not carrying the same repeated material.

Figure 5:
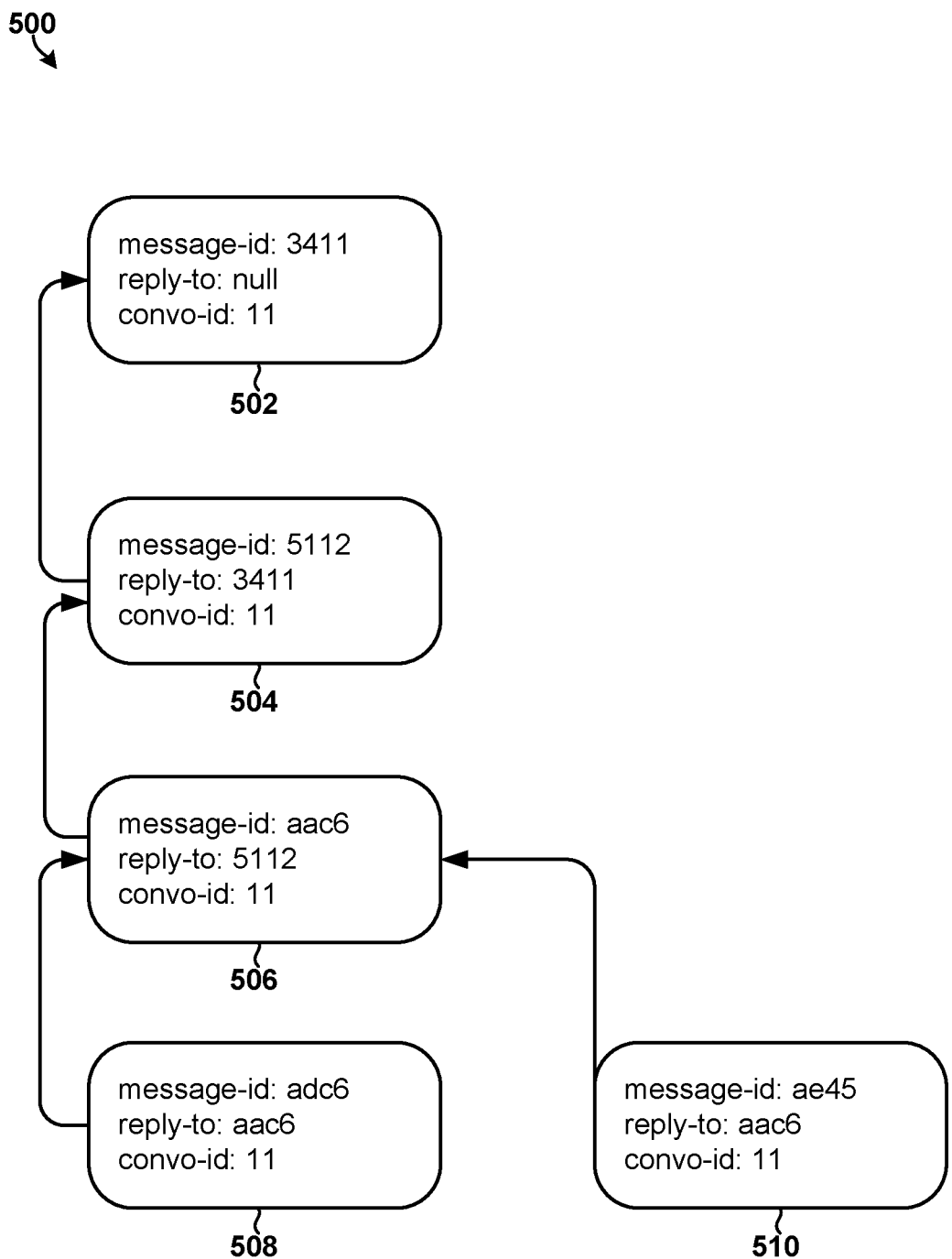
FIG. 5 is a structure diagram illustrating an example conversation that includes reduced sized messages generated in accordance with some embodiments.

FIG. 5 illustrates the structure of an example conversation that includes reduced size messages 502-510 generated in accordance with the embodiments. In the example illustrated in FIG. 5, message 502 is the first message in the conversation (e.g., a message generated by performing the operations in blocks 202-208, 302-312 or 408-418). Message 502 includes a message-id value of "3411," a reply-to value of null, and a convo-id value of "11."

Message 504 is a reply message sent in response to message 502. Message 504 includes a message-id value of "5112," a reply-to value of "3411," and a convo-id value of "11". That is, the reply-to value of message 504 is the same as the message-id value of message 502, thereby allowing message 504 to reference or point to its previous message within the conversation (i.e., message 502).

Message 506 is a reply message sent in response to message 504. Message 506 includes a message-id value of "aac6," a reply-to value of "5112," and a convo-id value of "11". The reply-to value "5112" of message 505 is the same as the message-id value of message 504, allowing message 506 to reference or point to its previous message within the conversation (i.e., message 504).

Messages 508 and 510 may be reply messages sent in response to message 506. That is, messages 508 and 510 are two replies created by two clients. Message 508 includes a message-id value of "adc6," a reply-to value of "aac6," and a convo-id value of "11". Message 510 includes a message-id value of "ae45," a reply-to value of "aac6," and a convo-id value of "11". At this point in the structure, the conversation tree may be split (or forked) to allow for side topics to be included in the same conversation flow. Any receiving client may classify such branches (e.g., stemming from messages 508 and 510) into a single conversation using the shared convo-id value, while avoiding content replication through message chaining.

In the methods and solutions discussed above, dropping a recipient from the conversation does not impact any of the other email recipients or the operation of the email client in any way. In addition, when a new recipient is added to the conversation after the conversation has started (i.e., when any number of messages have been exchanged already), such a new recipient does not have access to the whole message history by default. In such and embodiment, such a new recipient might request at least one of the email conversation participants to forward the missing messages for context (manual process) or have their email client automatically request a copy of the whole conversation (automatic process). The automatic request may then be sent from the new recipient's email client to the email client of at least one of the email conversation participants, and depending on their security settings, may be either approved automatically (low security setting) or manually (high security setting). Once approved, the email client may forward all messages in the requested email conversation to the requesting email client.

The requesting client may receive multiple copies of the same message (same message-id). However, a client device configured in accordance with the embodiments could use the message-id and reply-to fields/values to reconstruct the whole conversation structure. This allows the device to ignore multiple copies of the same message and/or to collect any missing messages in the conversation using a multicast-like approach.

Figure 6:
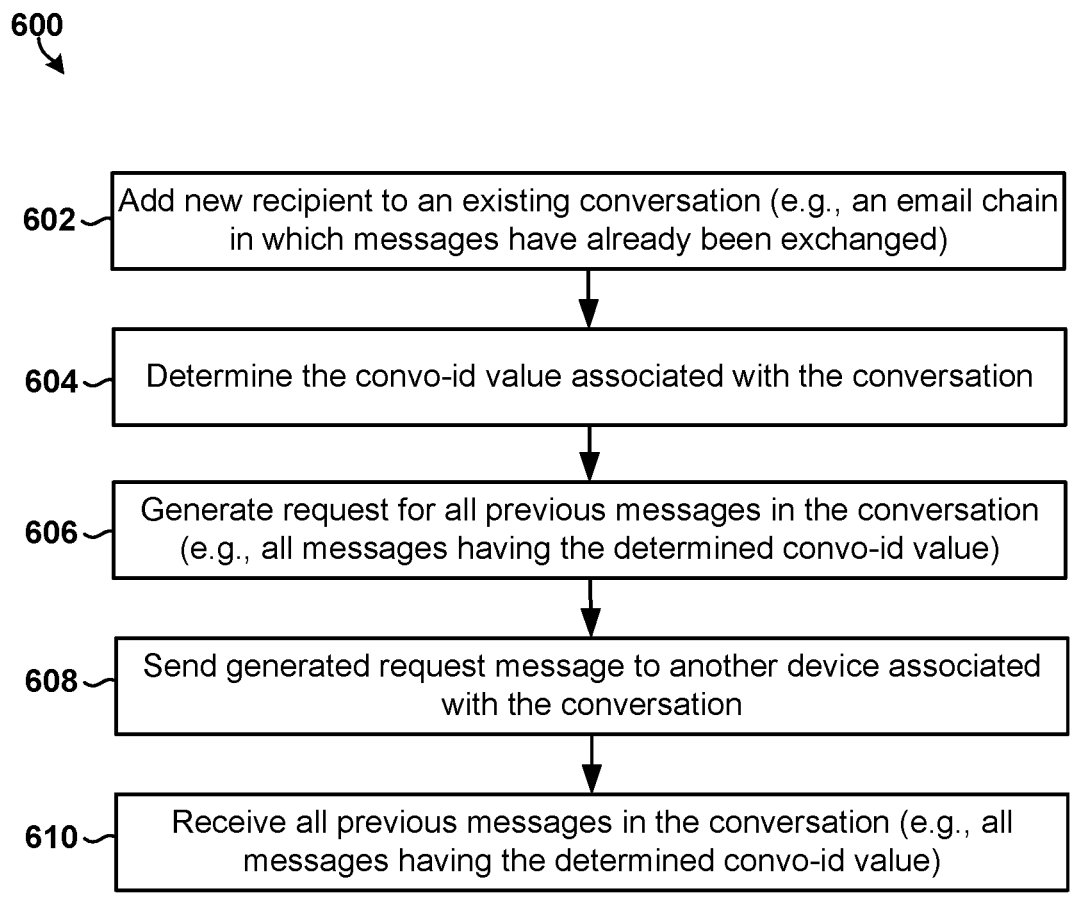
FIG. 6 is a process flow diagrams illustrating methods for generating reduced sized messages in accordance with various embodiments.

FIG. 6 illustrates a method 600 of adding new recipient is to a conversation after the conversation has started. All or portions of method 600 may be performed by one or more processors in one or more client devices (102, 104) and/or by a server processor in a mail server 110.

In block 602, a processor in server 110 or client device (102, 104) may add a new recipient (new client device, user account, email address, etc.) to an existing conversation. These operations may include sending an email to another client device to notify the new recipient that the user has been added to the conversation. In block 604, a processor in a server 110 or client device (102, 104) may determine the convo-id value associated with the conversation. In block 606, a processor in a server 110 or client device (102, 104) may generate a request message requesting that all previous messages in the conversation (e.g., all messages having the determined convo-id value) be sent to the user's client device. In block 608, a processor in a server 110 or client device (102, 104 may send the generated request message to another device associated with the conversation (e.g., another email client, mail server, etc.). In block 610, a processor in a server or client device (e.g., the user's client device) may receive all previous messages in the conversation (e.g., all messages having the determined convo-id value).

Figure 7:
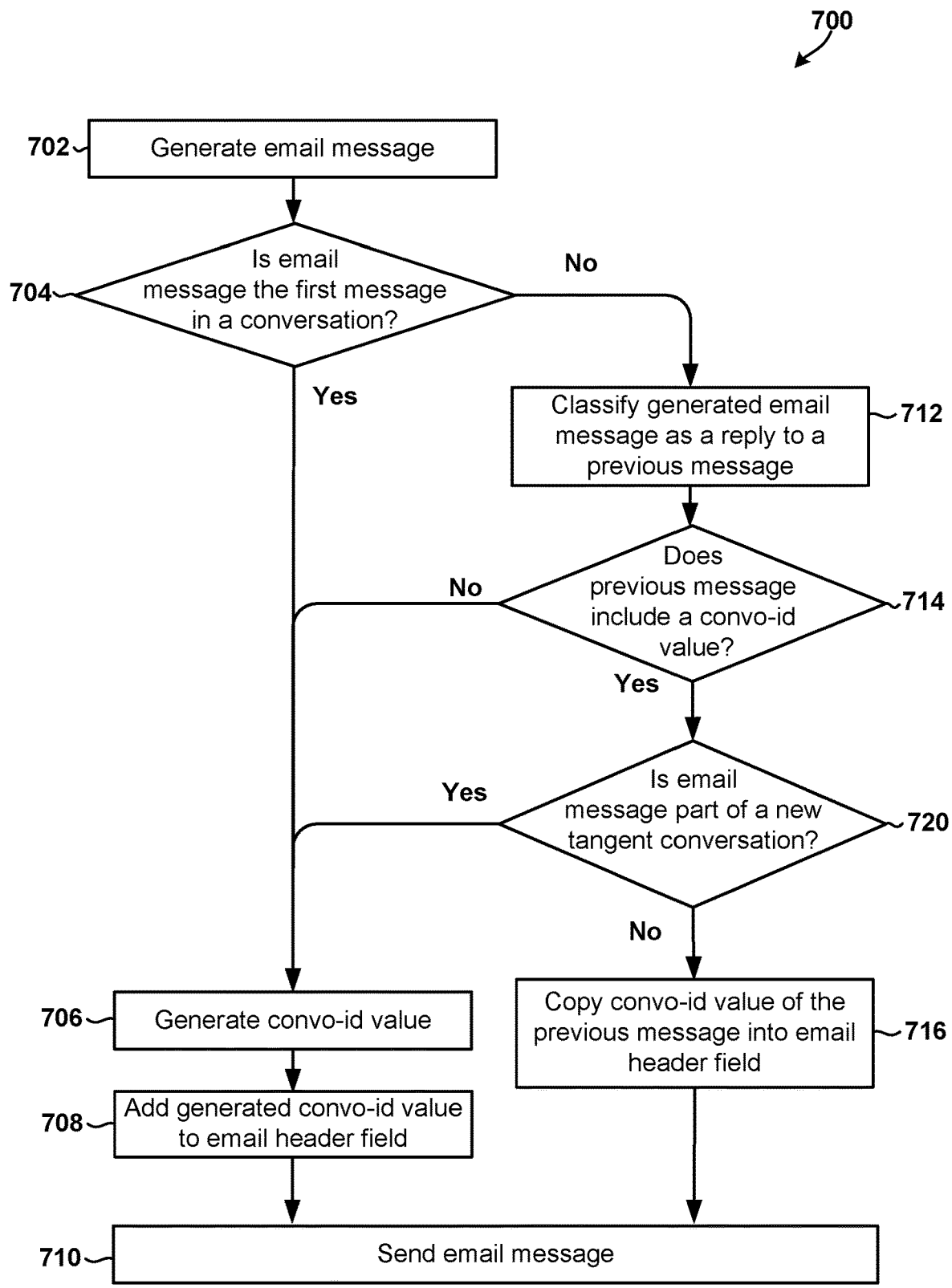
FIG. 7 is a process flow diagrams illustrating methods for generating reduced sized messages in accordance with various embodiments.

FIG. 7 illustrates a method 700 of reducing the size of email messages associated with a conversation and allowing for the start of new tangent conversations in accordance with an embodiment. All or portions of method 700 may be performed by a processor in a client device (102, 104) that includes an email client (or an extended email client) and/or by a server processor in a mail server 110. In blocks 702-716, the processor may perform the same or similar operations as in blocks 202-216 illustrated and described above with reference to FIG. 2. In determination block 720, the processor may determine whether the generated email message is part of a new tangent conversation that includes different participants or extends a different line of thought than the original conversation. For example, the processor may determine whether the email includes a significantly reduced subset of the participants, substantially different participants than the original conversation, or whether the user has expressly designated the conversation as a new or tangent conversation.

In response to determining that the generated email message is part of a new tangent conversation (i.e., determination block 720="Yes"), the processor may generate a convo-id value in block 706, add the generated convo-id value to the header field of the generated message (or overwrite the existing convo-id value) in block 708, and send the generated message in block 710.

In response to determining that the generated email message is not part of a new tangent conversation (i.e., determination block 720="Yes"), the processor may copy the convo-id value of the previous email message into an email header field (e.g., the convo-id header field) of the generated email in block 716 and send the email message in block 710.

Figure 8:
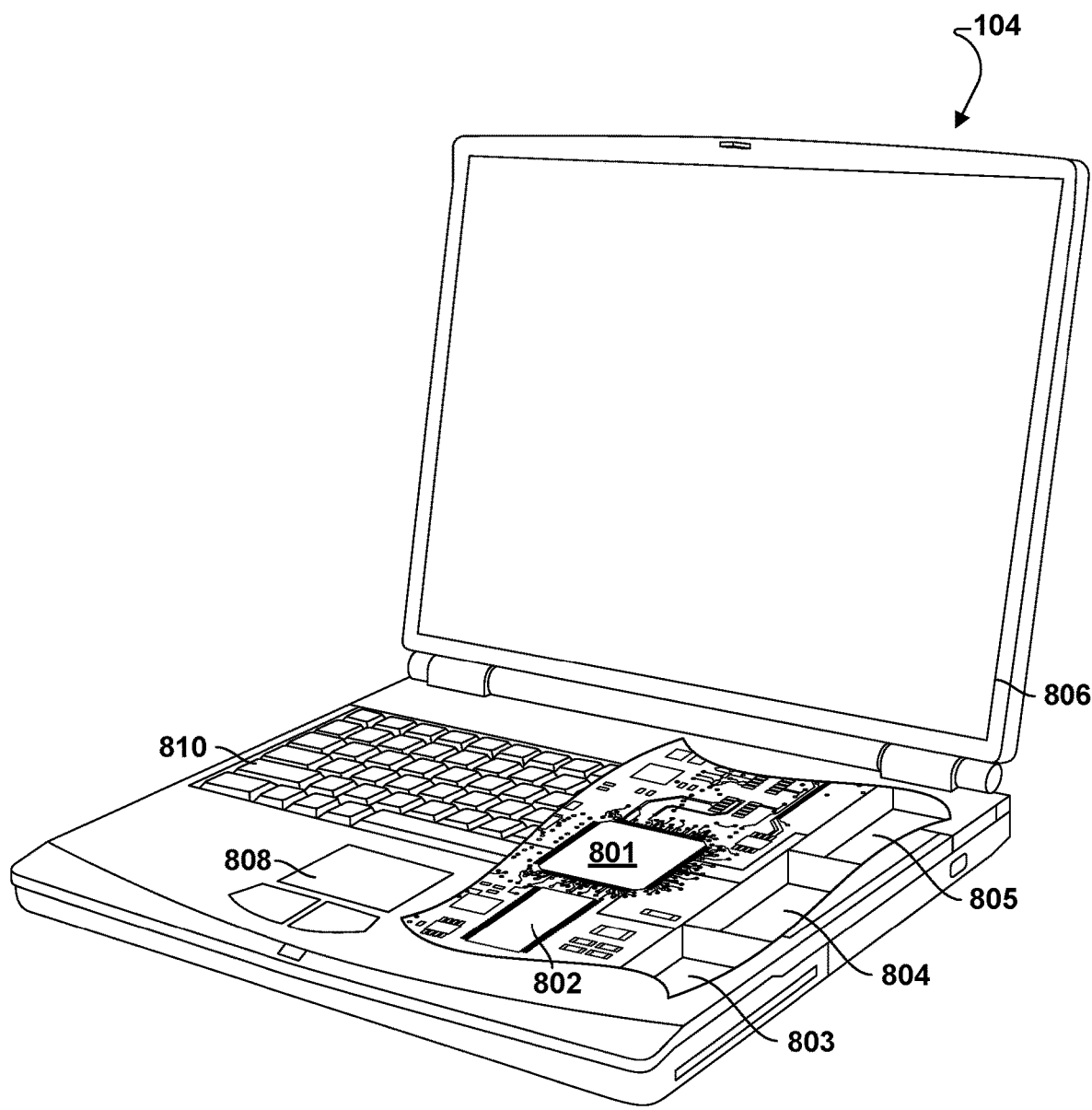
FIG. 8 is a component diagram of an example client device in the form of a portable device suitable for generating and using reduced sized messages in accordance with various embodiments.

The various embodiments described above may be implemented within a variety of client devices, such as a portable computer 104 as illustrated in FIG. 8. Many portable computers include a touch pad touch surface 808 that serves as the computer's pointing device, and thus may receive drag, scroll, and flick gestures similar to those implemented on client devices (e.g., mobile devices, etc.) equipped with a touch screen display and described above. A portable computer 104 will typically include a processor 801 coupled to volatile memory 802 and a large capacity nonvolatile memory, such as a disk drive 803 of Flash memory. The portable computer 104 may also include a floppy disc drive 804 and a compact disc (CD) drive 805 coupled to the processor 801. The portable computer 104 may also include a number of connector ports coupled to the processor 801 for establishing data connections or receiving external memory devices, such as a USB or FireWire® connector sockets, or other network connection circuits for coupling the processor 801 to a network. In a notebook configuration, the computer housing includes the touch pad touch surface 808, the keyboard 810, and the display 806 all coupled to the processor 801. Other configurations of the computing device may include a computer mouse or trackball coupled to the processor (e.g., via a USB input) as are well known, which may also be used in conjunction with the various embodiments.

Figure 9:
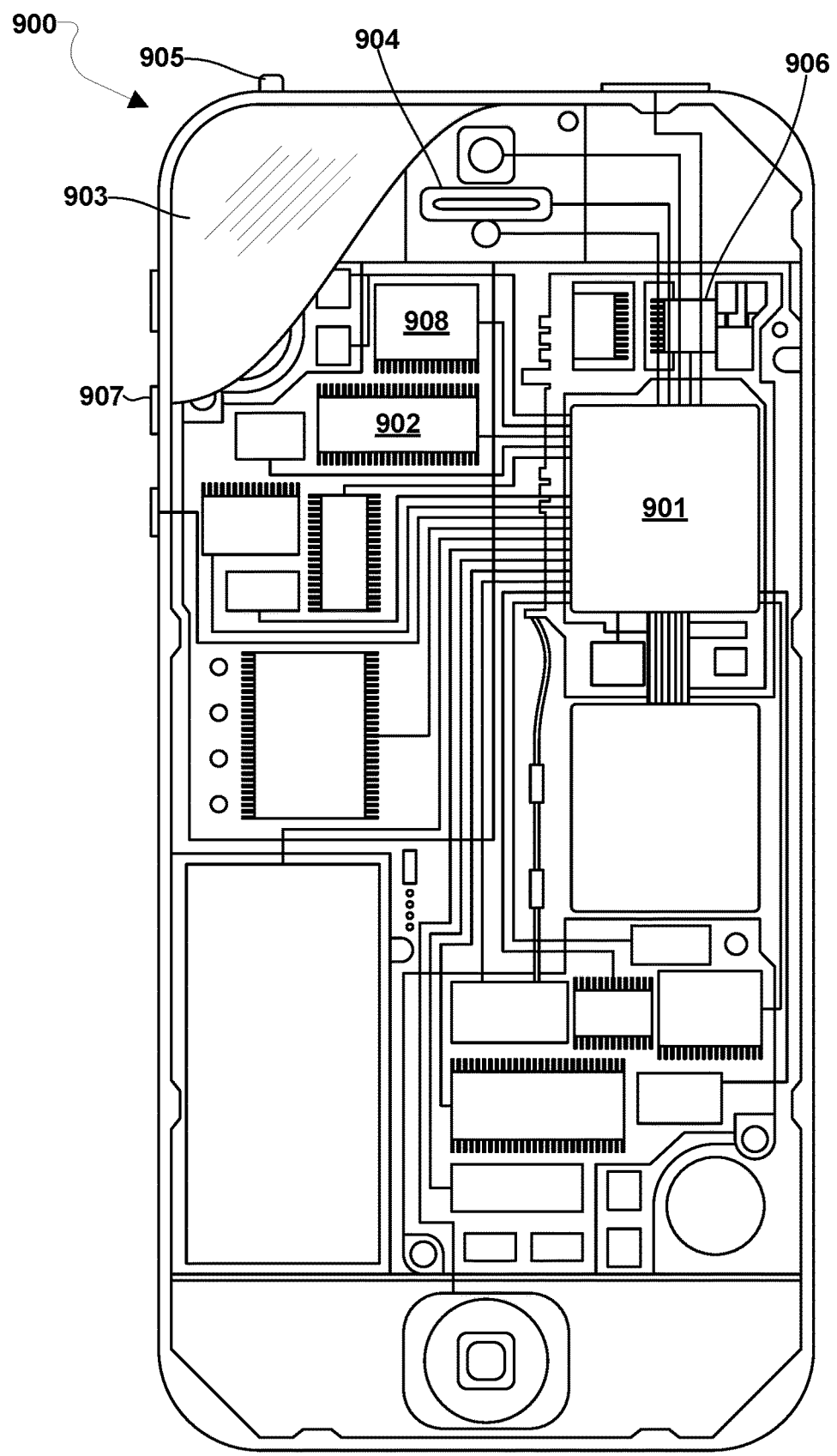
FIG. 9 is a component block diagram of an example client device in the form of a mobile device suitable for generating and using reduced sized messages in accordance with various embodiments.

The various embodiments may be implemented in other types of client devices, an example of which is illustrated in FIG. 9 in the form of a mobile device 900. A mobile device 900 may include a processor 901 coupled to internal memory 902, a display 903, and to a speaker 904. Additionally, the mobile device 900 may include an antenna 905 for sending and receiving electromagnetic radiation that may be connected to a wireless data link and/or cellular telephone transceiver 906 coupled to the processor 901. Mobile devices 900 typically also include menu selection buttons or rocker switches 907 for receiving user inputs.

A typical mobile device 900 also includes a sound encoding/decoding (CODEC) circuit 908, which digitizes sound received from a microphone into data packets suitable for wireless transmission and decodes received sound data packets to generate analog signals that are provided to the speaker to generate sound. Also, one or more of the processor 901, wireless transceiver 908 and CODEC 910 may include a digital signal processor (DSP) circuit (not shown separately).

Figure 10:
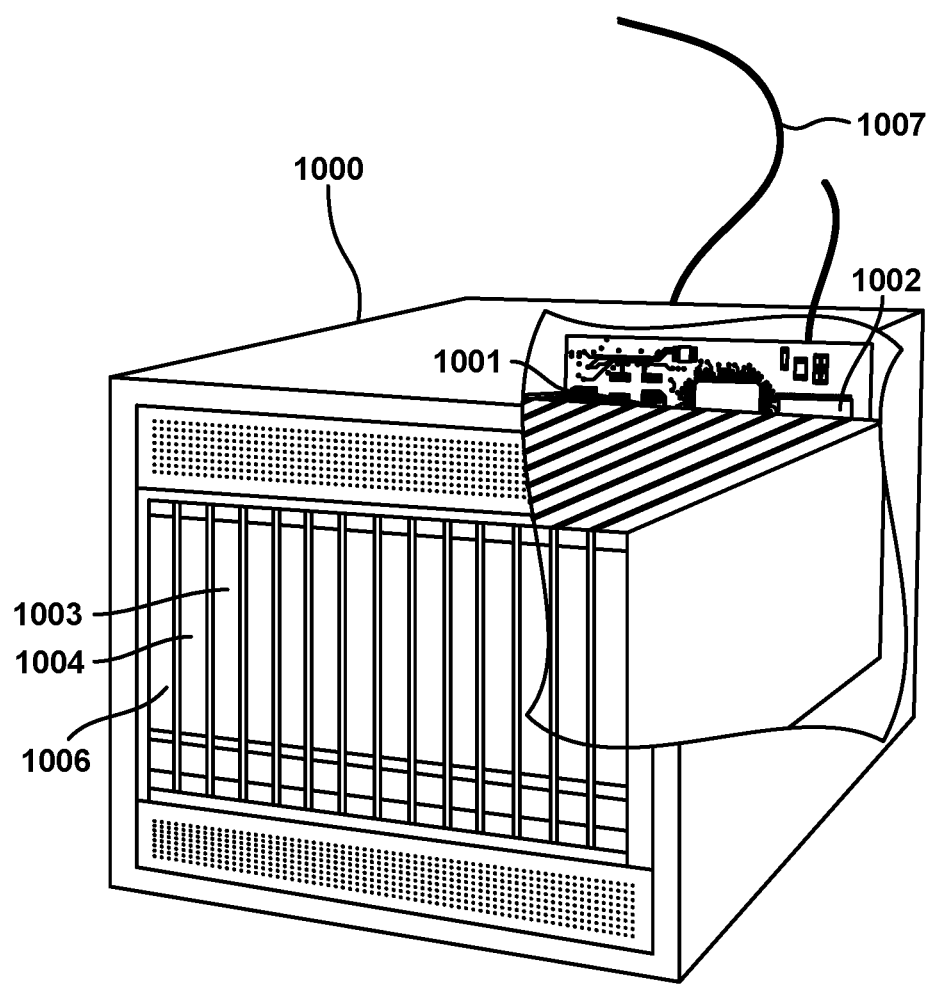
FIG. 10 is a component block diagram of a server computing device suitable for use with various embodiments.

Some embodiments may be implemented on a variety of network devices, an example of which is illustrated in FIG. 10 in the form of a network computing device 1000 functioning as a mail server. A network computing device 1000 may include a processor 1001 coupled to volatile memory 1002 and a large capacity nonvolatile memory, such as a disk drive 1003. The network computing device 1000 may also include a peripheral memory Access device such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network 1007, such as the Internet and/or a local area network coupled to other system computers and servers. The network computing device 1000 may include one or more antennas 807 for sending and receiving electromagnetic radiation that may be connected to a wireless communication link. The network computing device 1000 may include additional access ports, such as USB, Firewire, Thunderbolt, and the like for coupling to peripherals, external memory, or other devices.

The processors may be any programmable microprocessor, microcomputer or multiple processor chip or chips that can be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory 906 before they are accessed and loaded into the processor. The processor may include internal memory sufficient to store the application software instructions.

The processors of the client devices may be any programmable microprocessor, microcomputer or multiple processor chip or chips that can be configured by software instructions (applications) to perform a variety of functions, including the functions of the various embodiments described below. In some mobile devices, multiple processors may be provided, such as one processor dedicated to wireless communication functions and one processor dedicated to running other applications. Typically, software applications may be stored in the memory 612 before they are accessed and loaded into the processor. The processors may include internal memory sufficient to store the application software instructions.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple Access (CDMA) systems (e.g., cdmaOne, CDMA1020™), Wideband Code Division Multiple Access (WCDMA), Time Division Multiple Access (TDMA), orthogonal frequency division multiplexing (OFDM), single-carrier frequency division multiplexing (SC-FDM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing the method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A system, comprising:
a client device comprising a client device processor; and
a recipient device comprising a recipient device processor,
wherein the client device processor is configured with processor-executable instructions to:
generate a message that includes a conversation identifier (convo-id) header field, a message-id header field, and a reply-to header field;
determine whether the generated message is a first message in a conversation;
generate a convo-id value, include the generated convo-id value in the convo-id header field of the generated message and set a value of the reply-to header field of the generated message to null in response to determining that the generated message is the first message in the conversation;
set the convo-id value of the convo-id header field of the generated message equal to the value of the convo-id header field of a previous message and set the value of the reply-to header field of the generated message based on the value of the message-id header field of the previous message in response to determining that the generated message is not the first message in the conversation; and
send the message to the recipient device, and
wherein the recipient device processor is configured with processor-executable instructions to:
receive the message from the client device;
associate the received message with the conversation based on the convo-id value of the convo-id header field of the received message; and
place the received message within the conversation relative to other messages in the conversation based on the value of the reply-to header field of the received message.

2. A method of reducing sizes of electronic messages in a conversation, comprising:
generating, by a processor in a client device, a message that includes a conversation identifier (convo-id) header field and a reply-to header field;
determining, by the processor, whether the generated message is a first message in the conversation;
generating, by the processor, a convo-id value, including the generated convo-id value in the convo-id header field and setting a value of the reply-to header field to null in response to determining that the generated message is the first message in the conversation;
setting the convo-id value of the convo-id header field of the generated message equal to the value of a corresponding header field of a previous message, and setting the value of the reply-to header field of the generated message based on the value of a message-id header field of the previous message, in response to determining that the message is not the first message in the conversation; and
sending the message to a recipient device.

3. The method of claim 2, further comprising:
receiving, by a recipient device processor, the message from the client device; and
associating, by the recipient device processor, the received message with the conversation based on the convo-id value of the convo-id header field of the received message.

4. The method of claim 2, wherein generating the message that includes the convo-id header field and the reply-to header field comprises generating the message to include the convo-id header field, the message-id header field, and the reply-to header field.

5. The method of claim 4, further comprising using a hash to determine the value for the message-id header field of the generated message.

6. The method of claim 2, further comprising:
receiving, by a recipient device processor, the message from the client device;
associating, by the recipient device processor, the received message with the conversation based on the convo-id value of the convo-id header field of the received message; and
placing, by the recipient device processor, the received message within the conversation relative to other messages in the conversation based on the value of the reply-to header field of the received message.

7. A client device, comprising:
a processor configured with processor-executable instructions to:
generate a message that includes a conversation identifier (convo-id) header field and a reply-to header field;
determine whether the generated message is a first message in a conversation;
generate a convo-id value, include the generated convo-id value in the convo-id header field and set a value of the reply-to header field to null in response to determining that the generated message is the first message in the conversation;
set the convo-id value of the convo-id header field of the generated message equal to the value of a corresponding header field of a previous message, and setting the value of the reply-to header field of the generated message based on the value of a message-id header field of the previous message, in response to determining that the message is not the first message in the conversation; and
send the message to a recipient device.

8. The client device of claim 7, wherein the processor is configured to cause a recipient device processor to receive the message from the client device and associate the received message with the conversation based on the convo-id value of the convo-id header field of the received message.

9. The client device of claim 7, wherein the processor is configured to generate the message that includes the convo-id header field and the reply-to header field by generating the message to include the convo-id header field, the message-id header field, and the reply-to header field.

10. The client device of claim 9, wherein the processor is configured to use a hash to determine the value for the message-id header field of the generated message.

11. The client device of claim 7, wherein the processor is configured to cause a recipient device processor to:
   receive the message from the client device;
   associate the received message with the conversation based on the convo-id value of the convo-id header field of the received message; and
   place the received message within the conversation relative to other messages in the conversation based on the value of the reply-to header field of the received message.

12. A non-transitory computer readable storage medium having stored thereon processor-executable software instructions configured to cause a processor in a client device to perform operations for reducing sizes of electronic messages in a conversation, the operations comprising:
   generating a message that includes a conversation identifier (convo-id) header field and a reply-to header field;
   determining whether the generated message is a first message in the conversation;
   generating a convo-id value, including the generated convo-id value in the convo-id header field and setting a value of the reply-to header field to null in response to determining that the generated message is the first message in the conversation;
   setting the convo-id value of the convo-id header field of the generated message equal to the value of a corresponding header field of a previous message, and setting the value of the reply-to header field of the generated message based on the value of a message-id header field of the previous message, in response to determining that the message is not the first message in the conversation; and
   sending the message to a recipient device.

13. The non-transitory computer readable storage medium of claim 12, wherein the stored processor-executable software instructions are configured to cause the processor to perform operations further comprising causing a recipient device processor to perform operations comprising:
   receiving the message from the client device; and
   associating the received message with the conversation based on the convo-id value of the convo-id header field of the received message.

14. The non-transitory computer readable storage medium of claim 12, wherein the stored processor-executable software instructions are configured to cause the processor to perform operations such that generating the message that includes the convo-id header field and the reply-to header field comprises generating the message to include the convo-id header field, the message-id header field, and the reply-to header field.

15. The non-transitory computer readable storage medium of claim 14, wherein the stored processor-executable software instructions are configured to cause the processor to perform operations further comprising using a hash to determine the value for the message-id header field of the generated message.

16. The non-transitory computer readable storage medium of claim 12, wherein the stored processor-executable software instructions are configured to cause the processor to perform operations further comprising causing a recipient device processor to perform operations comprising:
   receiving the message from the client device;
   associating the received message with the conversation based on the convo-id value of the convo-id header field of the received message; and
   placing the received message within the conversation relative to other messages in the conversation based on the value of the reply-to header field of the received message.

* * * * *